US011474567B2

(12) United States Patent
Chen (10) Patent No.: US 11,474,567 B2
(45) Date of Patent: Oct. 18, 2022

(54) HINGE FOR INNER FLEXIBLE SCREEN MOBILE TERMINAL AND INNER FLEXIBLE SCREEN MOBILE TERMINAL

(71) Applicant: Hangzhou Amphenol Phoenix Telecom Parts Co., Ltd., Zhejiang (CN)

(72) Inventor: Guanlun Chen, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 254 days.

(21) Appl. No.: 16/758,759

(22) PCT Filed: Oct. 30, 2018

(86) PCT No.: PCT/CN2018/112633
§ 371 (c)(1),
(2) Date: Apr. 23, 2020

(87) PCT Pub. No.: WO2019/085891
PCT Pub. Date: May 9, 2019

(65) Prior Publication Data
US 2020/0341523 A1 Oct. 29, 2020

(30) Foreign Application Priority Data

Nov. 3, 2017 (CN) .......................... 201721457594.4

(51) Int. Cl.
*G06F 1/16* (2006.01)
*E05D 3/12* (2006.01)
*H04M 1/02* (2006.01)

(52) U.S. Cl.
CPC .......... *G06F 1/1681* (2013.01); *E05D 3/122* (2013.01); *E05Y 2900/606* (2013.01); *H04M 1/022* (2013.01)

(58) Field of Classification Search
CPC .............................. E05D 3/122; G06F 1/1681
See application file for complete search history.

(56) References Cited

U.S. PATENT DOCUMENTS 10,209,743 B1 * 2/2019 Hsu ...................... G06F 1/1681
2016/0295709 A1 * 10/2016 Ahn ..................... H05K 5/0226
(Continued)

FOREIGN PATENT DOCUMENTS

CN 103034293 A 4/2013
CN 103576775 A 2/2014
(Continued)

*Primary Examiner* — Jason W San
(74) *Attorney, Agent, or Firm* — Muncy, Geissler, Olds & Lowe, P.C.

(57) ABSTRACT

Disclosed is a hinge for an inner flexible screen mobile terminal, the hinge comprising a left support structure, a right support structure and a middle support structure, a pair of left connecting arms and a pair of right connecting arms, and a left rotatable support member and a right rotatable support member, wherein the left connecting arms and the right connecting arms are respectively rotatably connected on the left side and the right side of the middle support structure; and the left rotatable support member and the right rotatable support member are rotated downwards to a lower position to leave a space for accommodating a bent portion of the flexible screen when the hinge is folded, and when the hinge is rotated to a state corresponding to the spreading of the flexible screen, the left rotatable support member and the right rotatable support member are rotated to a higher position, and the left support structure and the right support structure are respectively provided with a rotation guide structure for the left rotatable support member and the right rotatable support member. The hinge of the present invention has a simple and reliable structure, and when applied to a mobile terminal such as a mobile phone, an e-book or a
(Continued)

computer, the hinge can be used as both a hinge and flexible screen support structure therein.

8 Claims, 6 Drawing Sheets

(56) References Cited

U.S. PATENT DOCUMENTS

| | | | | |
|---|---|---|---|---|
| 2016/0370828 A1* | 12/2016 | Hsu | ........................ | G06F 1/1681 |
| 2016/0370829 A1* | 12/2016 | Hsu | ........................ | G06F 1/1681 |
| 2017/0064844 A1* | 3/2017 | Hsu | ............................ | G02F 1/13 |
| 2019/0086960 A1* | 3/2019 | Jiang | ...................... | G06F 1/1618 |
| 2019/0179373 A1* | 6/2019 | Cheng | ..................... | H04M 1/02 |
| 2020/0293094 A1* | 9/2020 | Liu | ........................ | G06F 1/1681 |
| 2020/0409422 A1* | 12/2020 | Wang | ................... | H05K 5/0226 |
| 2020/0413555 A1* | 12/2020 | Ho | ........................ | G06F 1/1681 |
| 2021/0064098 A1* | 3/2021 | Xiao | ..................... | H04B 1/3888 |
| 2021/0075895 A1* | 3/2021 | Cheng | ................... | G06F 1/1681 |
| 2021/0199153 A1* | 7/2021 | Hsu | ........................ | E05D 3/122 |
| 2021/0222729 A1* | 7/2021 | Hsu | ............................ | E05D 1/00 |
| 2021/0307185 A1* | 9/2021 | Hong | ................... | H05K 5/0026 |
| 2021/0307186 A1* | 9/2021 | Hong | ..................... | F16C 11/04 |
| 2021/0311137 A1* | 10/2021 | Chen | ...................... | G01D 5/145 |
| 2021/0325936 A1* | 10/2021 | Zhu | ........................ | G06F 1/1681 |
| 2021/0325941 A1* | 10/2021 | Hou | ..................... | G06F 1/1681 |
| 2021/0333837 A1* | 10/2021 | Xu | .......................... | F16C 11/12 |

FOREIGN PATENT DOCUMENTS

| | | |
|---|---|---|
| CN | 105491193 A | 4/2016 |
| CN | 106205385 A | 12/2016 |
| CN | 205978043 U | 2/2017 |
| CN | 207543155 U | 6/2018 |

* cited by examiner

HINGE FOR INNER FLEXIBLE SCREEN MOBILE TERMINAL AND INNER FLEXIBLE SCREEN MOBILE TERMINAL

FIELD OF THE INVENTION

The present invention relates to a mobile terminal and a hinge thereof.

BACKGROUND

Flexible screen is an emerging screen. For the mechanical structure of a mobile terminal having a flexible screen, what needs to be solved is how to support the flexible screen to meet the characteristics of bending required by the flexible screen when the mobile terminal is folded such that the flexible screen can be applied to the mobile terminal.

SUMMARY

An object of the present invention is to provide a hinge for an inner flexible screen mobile terminal which has a simple structure and can be used as a hinge for a mobile terminal with a flexible screen inside. To achieve this object, the present invention adopts the following technical solutions:

A hinge for an inner flexible screen mobile terminal, comprising a left support structure, a right support structure and a middle support structure; wherein the hinge further comprising a pair of left connecting arms and a pair of right connecting arms, the left connecting arms and the right connecting arms are respectively rotatably connected on the left side and the right side of the middle support structure, the left support structure and the left connecting arm, the right support structure and the right connecting arm are slidingly connected and provided with a sliding stroke limit structure;

A left rotatable support member and a right rotatable support member are respectively provided between the left connecting arm and the right connecting arm on the inner side of the hinge, the left rotatable support member and the right rotatable support member are rotatably connected to the upper portions of left and right sides of the middle support structure respectively, a structure is provided between the left connecting arm and the left support structure and between the right connecting arm and the right support structure to prevent their relative rotation, a compression spring is provided between the left connecting arm and the left support structure and between the right connecting arm and the right support structure, and the left rotatable support member and the right rotatable support member are rotated downwards to a lower position to leave a space for accommodating a bent portion of the flexible screen when the hinge is folded, and when the hinge is rotated to a state corresponding to the spreading of the flexible screen, the left rotatable support member and the right rotatable support member are rotated to a higher position, and the left support structure and the right support structure are respectively provided with a rotation guide structure for the left rotatable support member and the right rotatable support member.

On the basis of adopting the above technical solutions, the present invention may adopt the following further technical solutions or a combination of these technical solutions:

The left connecting arm and the right connecting arm are connected by a transmission mechanism to achieve synchronous reverse rotation.

The middle support structure, the left rotatable support member and the right rotatable support member, the left support structure, and the right support structure jointly constitute a support structure for the spreading of the flexible screen.

A torque mechanism is provided between the middle support structure and the left connecting arm and between the middle support structure and the right connecting arm.

The left rotatable support member and the right rotatable support member are respectively formed by integrally connecting a plurality of finger-shaped structures, and the rotation guide structure comprise a guide plate arranged in a grid plate shape and is provide with a guide groove, and the guide plate fits the clearance of the finger-shaped structures.

The rotation guide structure is provided with a guide groove, and the left rotatable support member and the right rotatable support member are respectively provided with guide rods mating with the guide groove, and a flat groove is provided at the top of the guide groove, and when the hinge is rotated to a state corresponding to the spreading of the flexible screen, the movement of the left support structure and the right support structure back to the middle makes the guide rod to enter the flat groove and lock the state corresponding to the spreading of the flexible screen that the hinge is rotated to.

The torsion mechanism comprises a pair of Reed Pipe Fittings™, the reed pipe fittings are in the middle support structure, and the Reed Pipe Fittings™ have reed pipes corresponding to the left connecting arm and the right connecting arm respectively, one Reed Pipe Fitting™ corresponds to the left connecting arm and the right connecting arm on the same side, and is connected through a shaft, and the shaft passes through a middle support structure, the reed pipe-, and the -connecting arm, and the shaft is fixedly connected to the connecting arm and fits the clearance of the middle support structure, and is in a clamped relationship with the reed pipe-.

The left connecting arm and the right connecting arm are respectively on the inside of the left support structure and the right support structure, and the sliding stroke limit structure adopts a structure that mates long holes and pins.

Another object of the present invention is to provide an inner flexible screen mobile terminal using the above hinge. To achieve the object, the present invention adopts the following technical solutions:

An inner flexible screen mobile terminal, wherein a flexible screen is provided inside the mobile terminal, and the mobile terminal is provided with the hinge according to any one of claims 1 to 8, the flexible screen is laid on the inner side of the hinge, and is only fixedly connected to the middle portion of the middle support structure.

The present invention has a simple and reliable structure, and can support the inner flexible screen and meet the needs of bending the inner flexible screen when it is folded. When the hinge of the present invention is applied to mobile terminals such as mobile phones, e-books and computers, etc., it can be used as both a hinge and a flexible screen support structure therein. When the mobile phones and computers are unfolded and folded, the flexible screen can expand and bend freely, such that the flexible screen can be used in mobile terminals such as mobile phones, e-books, and computers, enabling the mobile terminal to achieve large-screen display in a small volume.

DETAILED DESCRIPTION

Figure 1:
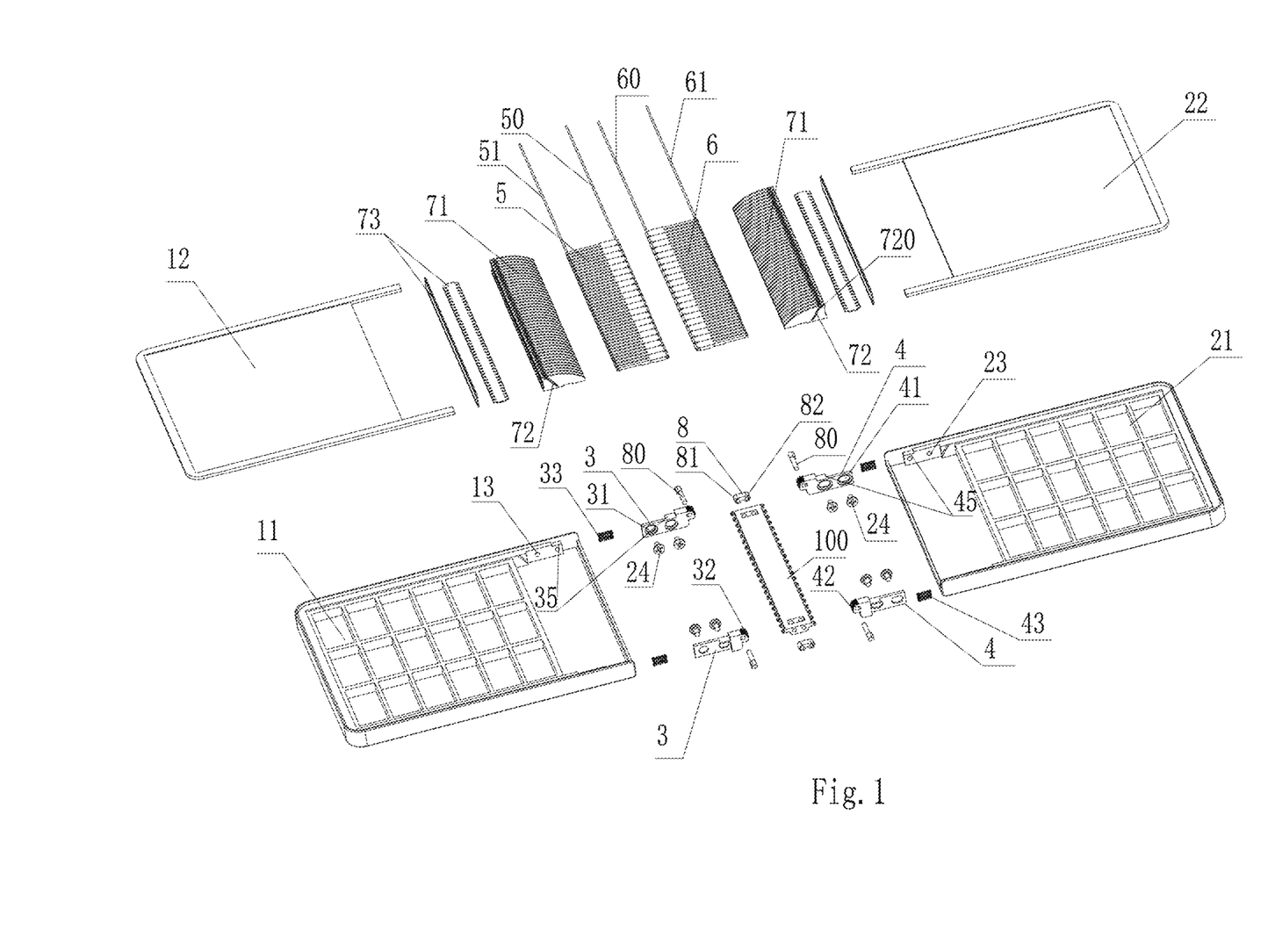
FIG. 1 is an exploded view of the hinge when applied to a mobile terminal in the present invention.
Figure 2:
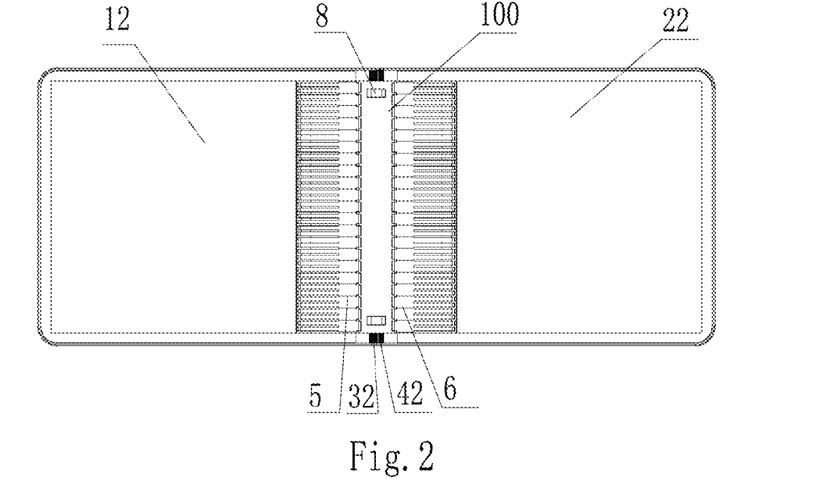
FIG. 2 is a top view of the hinge at the state of unfolding when applied to a mobile terminal in the present invention.
Figure 3:
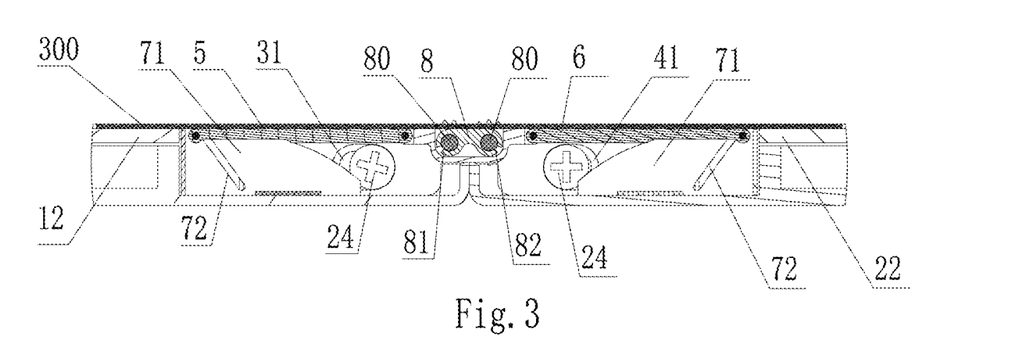
FIG. 3 is a cross-sectional view I of the hinge at the state of unfolding when applied to a mobile terminal in the present invention.
Figure 4:
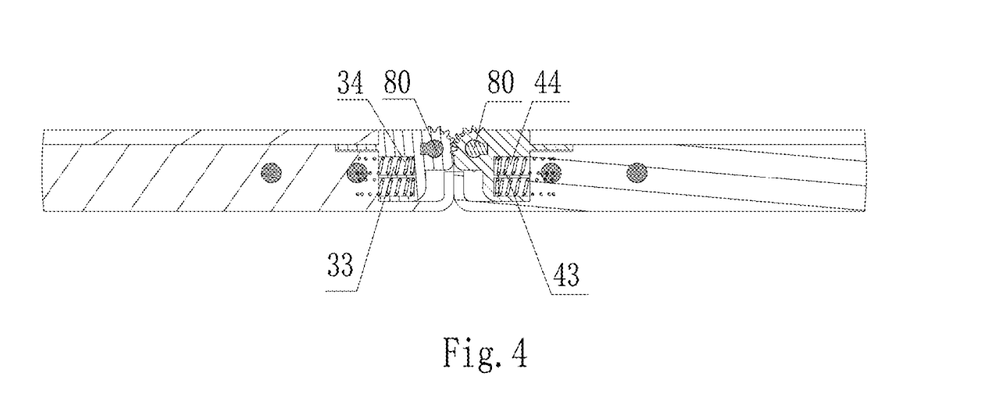
FIG. 4 is a cross-sectional view II of the hinge at the state of unfolding when applied to a mobile terminal in the present invention.
Figure 5:
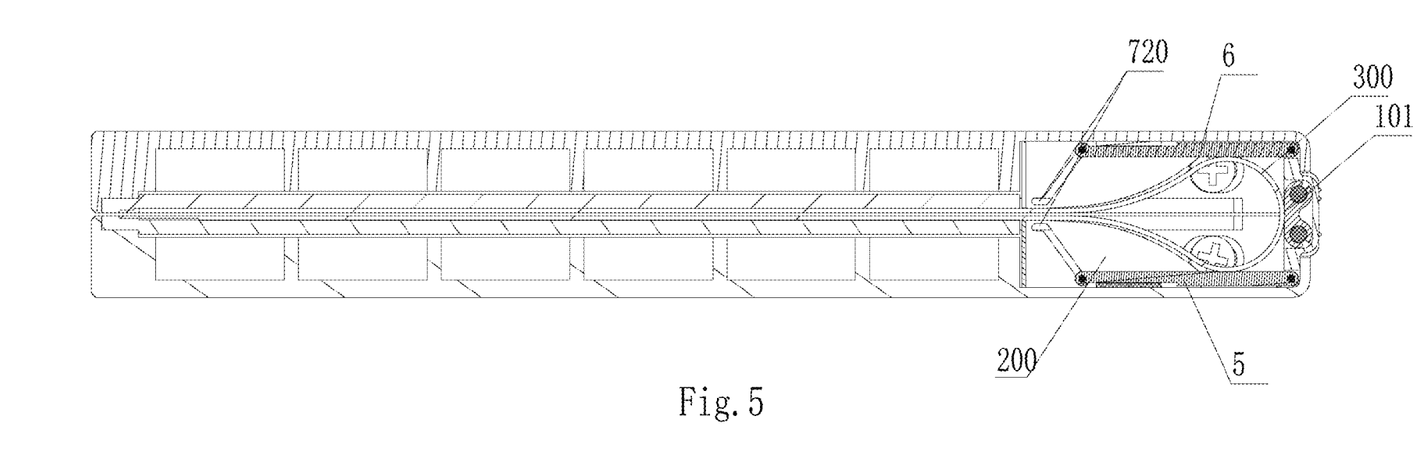
FIG. 5 is a cross-sectional view I of the hinge at the state of folding when applied to a mobile terminal in the present invention.
Figure 6:
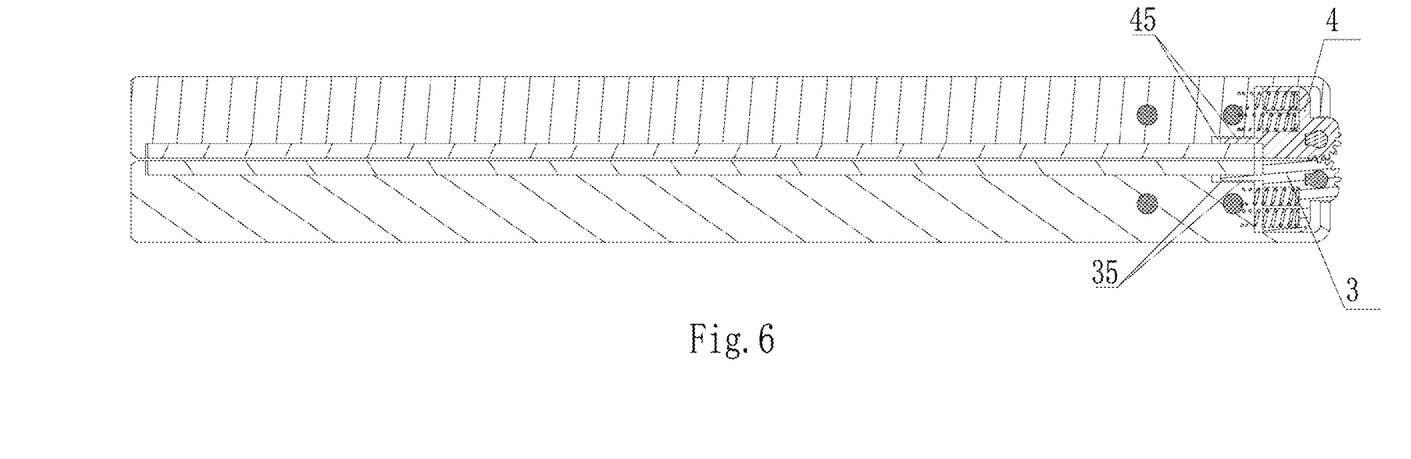
FIG. 6 is a cross-sectional view II of the hinge at the state of folding when applied to a mobile terminal in the present invention.
Figure 7:
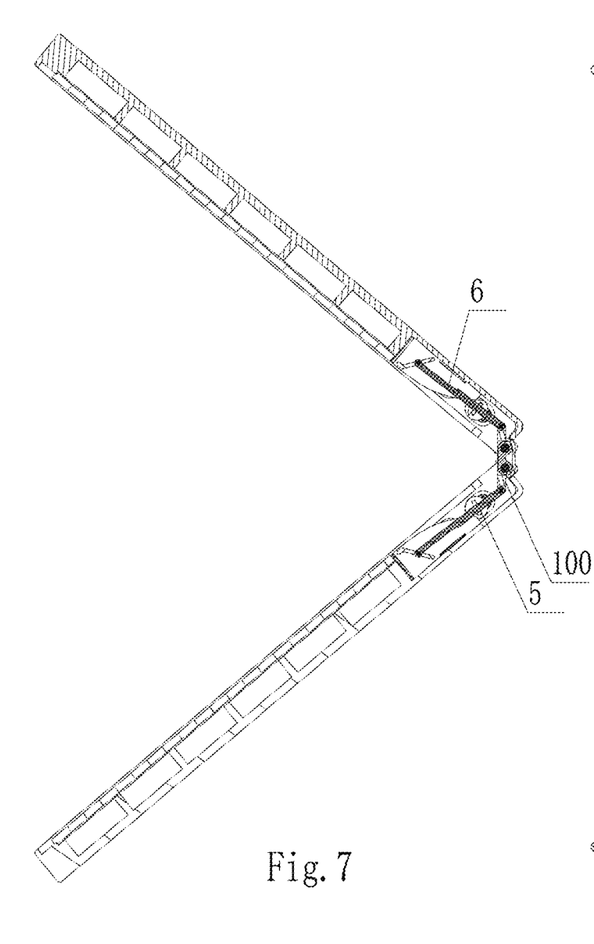
FIG. 7 is a cross-sectional view I of the hinge unfolded to close to 90° when applied to a mobile terminal in the present invention.
Figure 8:
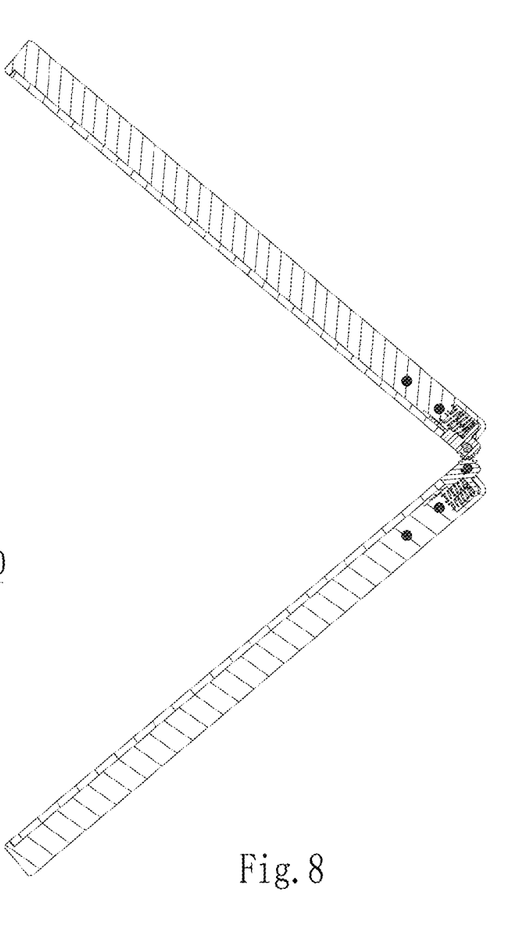
FIG. 8 is a cross-sectional view II of the hinge unfolded to close to 90° when applied to a mobile terminal in the present invention.
Figure 9:
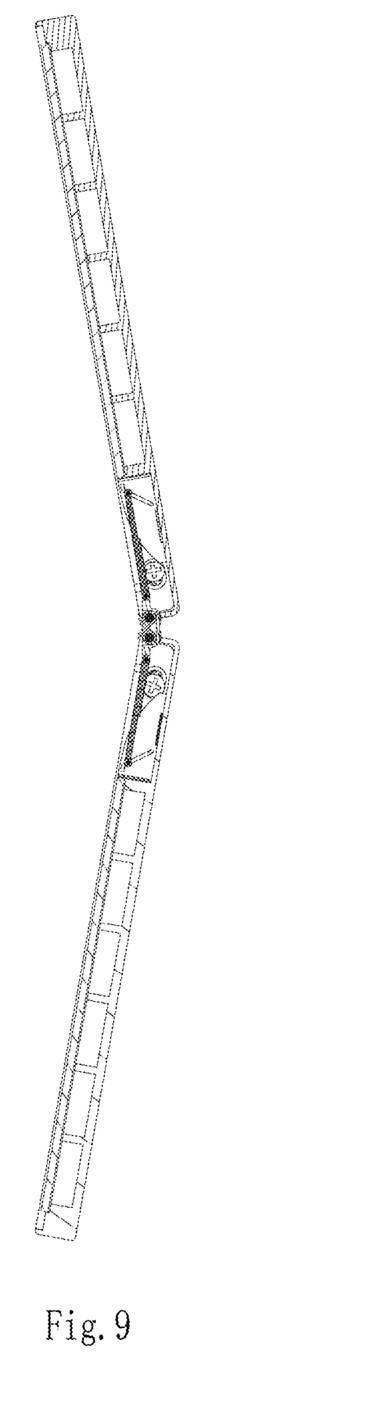
FIG. 9 is a cross-sectional view I of the hinge unfolded to close to flattening when applied to a mobile terminal in the present invention.
Figure 10:
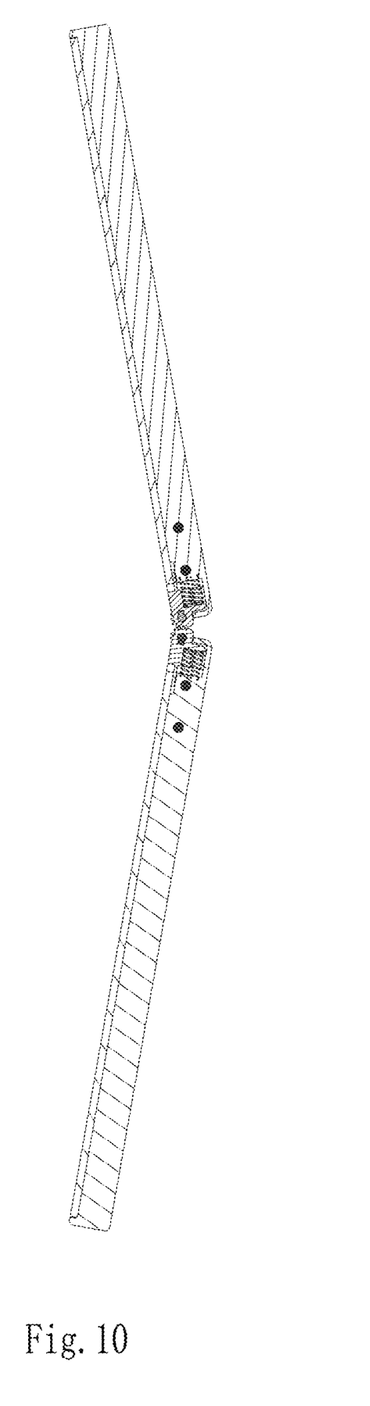
FIG. 10 is a cross-sectional view II of the hinge unfolded to close to flattening when applied to a mobile terminal in the present invention.
Figure 11:
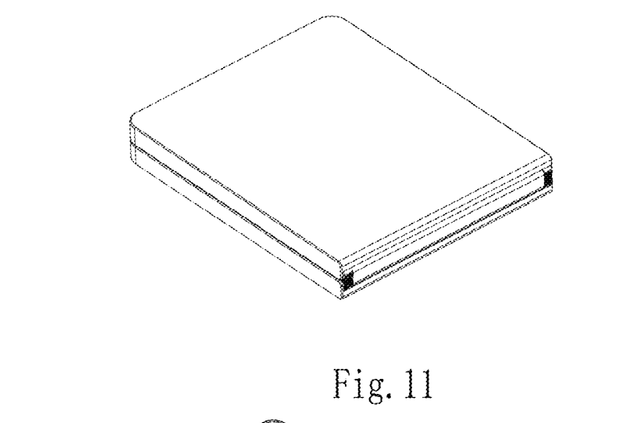
FIGS. 11, 12, and 13 are schematic diagrams of the hinge when it is folded, close to 90° and close to flattening respectively when applied to a mobile terminal in the present invention.
Figure 12:
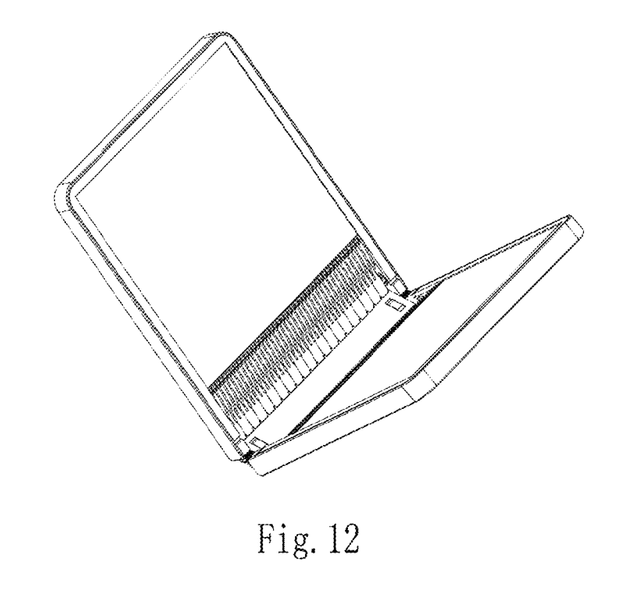
Figure 13:
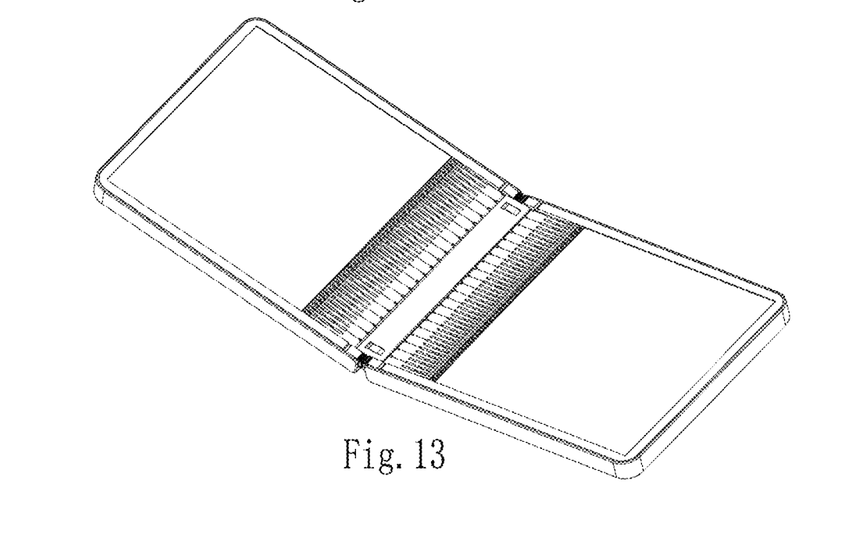

Referring to the figures, the present invention provides a hinge for an inner flexible screen mobile terminal, the hinge comprising a left support structure, a right support structure, and a middle support structure 100; the middle support structure 100 has a width, which basically matches the thickness when the hinge is folded. The left support structure comprises a fixedly connected shell 11 and a flexible screen support plate 12 inside the shell, and the right support structure comprises a fixedly connected shell 21 and a flexible screen support plate 22 inside the shell.

The hinge further comprises a pair of left connecting arms 3 and a pair of right connecting arms 4, the left connecting arms 3 and the right connecting arms 4 are respectively rotatably connected on the left side and the right side of the middle support structure 100, the left support structure and left connecting arm 3, the right support structure and the right connecting arm 4 are slidingly connected and provided with a sliding stroke limit structure; the stroke limit structure can adopt a structure that mates long holes and pins. The left connecting arm 3 and the right connecting arm 4 are respectively on the inside of the left support structure and the right support structure, and the screw holes 13, 23 are provided on the shells 11, 21 from the inside, and the left connecting arm 3 and the right connecting arm 4 are provided the long holes 31, 41, the screws 14, 24 are connected to the screw holes 13 and 23 through the long holes 31, 41.

The left connecting arm 3 and right connecting arm 4 is connected by a transmission mechanism to achieve synchronous reverse rotation, that is, to achieve the synchronous opening of left support structure and right support structure. The transmission mechanism may be a gear mechanism, and the gear mechanism may include gears 32, 42 respectively provided on the left connecting arm 3 and the right connecting arm 4, the gears 32, 42 have the same parameters, which are designed according to the requirements of hinge unfolding. The gears 32, 42 may be symmetrical as in this embodiment or may be asymmetrical.

The transmission mechanism can also adopt other forms to realize the reverse rotation between the left connecting arm 3 and the right connecting arm 4, which can be synchronous reverse rotation, or one of the stages during the hinge unfolding and folding process, one of which is suspended.

The left rotatable support member 45 and a right rotatable support member 6 are respectively provided between the left connecting arm 3 and the right connecting arm 4 on the inner side of the hinge, the left rotatable support member 5 and the right rotatable support member 6 are rotatably connected to the upper portions of left and right sides of the middle support structure through rotating shafts 50, 60 respectively, structures 35, 45 are provided between the left connecting arm 3 and the left support structure and between the right connecting arm 4 and the right support structure to prevent their relative rotation, and the anti-rotation structure may be a plane-to-plane structure or a keyway matching structure, compression springs 33, 43 are provided between the left connecting arm 3 and the left support structure and between the right connecting arm 4 and the right support structure. The compression springs are mounted in the mounting holes 34, 44 of the left connecting arm 3 and the right connecting arm 4, and the left rotatable support member 5 and the right rotatable support member 6 are rotated downwards to a lower position to leave a space 200 for accommodating a bent portion of the flexible screen when the hinge is folded, and when the hinge is rotated to a state corresponding to the spreading of the flexible screen, the left rotatable support member 5 and the right rotatable support member 6 are rotated to a higher position, and the left support structure and the right support structure are respectively provided with a rotation guide structure for the left rotatable support member and the right rotatable support member. As shown from the figure, in the present invention, when the left rotatable support member 5 and the right rotatable support member 6 are rotated downwards, the angle between the left connecting arm 3 and the middle support structure100 and the angle between the right connecting arm 4 and the middle support structure100 also change, when the hinge is folded, left rotatable support member 5 and the right rotatable support member 6 are lowered to the bottom of the space 200 in an almost flat state, maximizing the space 200.

The left rotatable support member 5 and the right rotatable support member 6 are respectively formed by integrally connecting a plurality of finger-shaped structures, and the rotation guide structure comprises a guide plate 71 arranged in a grid plate shape and is provide with a guide groove 72, and the guide plate 71 fits the clearance of the finger-shaped structures. The left rotatable support member 5 and the right rotatable support member 6 are respectively provided with guide rods 51, 61 mating with the guide groove 72, and a flat groove 720 is provided at the top of the guide groove 72, and when the hinge is rotated to a state corresponding to the spreading of the flexible screen, restricted by the length of the flexible screen, the movement of the left support structure and the right support structure back to the middle makes the guide rods 51, 61 to enter the flat groove 720 and lock the state corresponding to the spreading of the flexible screen that the hinge is rotated to.

The grid-shaped guide plate 71 may be connected as a whole by a connecting structure 73, and then mounted in the left support structure and the right support structure. The left rotatable support member 5 and the right rotatable support member 6 may also be other rotatable parts, for example, plates, blocks, etc.

A torque mechanism is provided between the middle support structure and the left connecting arm and between the middle support structure and the right connecting arm, to improve the operating feel and provide the functions of stop and positioning at any time. The torsion mechanism comprises a pair of Reed Pipe Fittings™ 8, the Reed Pipe Fittings™ 8 are in the middle support structure 100, and the Reed Pipe Fittings™ 8 have reed pipes 81, 82 corresponding to the left connecting arm and the right connecting arm respectively, one Reed Pipe Fittings™ 8 corresponds to the left connecting arm 3 and the right connecting arm 4 on the same side, and is connected through a shaft 80, and the shaft 80 passes through the middle support structure, the reed pipe-, and the -connecting arm, and the shaft is fixedly connected to the connecting arm and fits the clearance of the middle support structure, and is in a clamped relationship with the reed pipe-. The torsion mechanism can also be arranged between other parts where relative rotation occurs.

For the mobile terminal using the above hinge, taking a mobile phone or an e-book as an example, the flexible screen 300 is laid on the inner side of the hinge, and is only fixedly connected to the middle portion 101 of the middle support structure 100, and the flexible screen is fixedly connected with the left support structure and the right support structure. The middle support structure 100, the left rotatable support member 5 and the right rotatable support member 6, the left support structure, and the right support structure jointly constitute a support structure for the spreading of the flexible screen.

The foregoing description only presents specific embodiments of the present invention, but the structural features of the present invention are not limited thereto. Any changes or modifications made by those skilled in the art within the field of the present invention shall fall into the scope of protection of the present invention.

The invention claimed is:

1. A hinge for an inner flexible screen mobile terminal, comprising a left support structure, a right support structure and a middle support structure; wherein the hinge further comprising a pair of left connecting arms and a pair of right connecting arms, the left connecting arms and the right connecting arms are respectively rotatably connected on the left side and the right side of the middle support structure, the left support structure and the left connecting arm, the right support structure and the right connecting arm are slidingly connected and provided with a sliding stroke limit structure;

a left rotatable support member and a right rotatable support member are respectively provided between the left connecting arm and the right connecting arm on the inner side of the hinge, the left rotatable support member and the right rotatable support member are rotatably connected to the upper portions of left and right sides of the middle support structure respectively, a structure is provided between the left connecting arm and the left support structure and between the right connecting arm and the right support structure to prevent their relative rotation, a compression spring is provided between the left connecting arm and the left support structure and between the right connecting arm and the right support structure, and the left rotatable support member and the right rotatable support member are rotated downwards to a lower position to leave a space for accommodating a bent portion of the flexible screen when the hinge is folded, and when the hinge is rotated to a state corresponding to the spreading of the flexible screen, the left rotatable support member and the right rotatable support member are rotated to a higher position, and the left support structure and the right support structure are respectively provided with a rotation guide structure for the left rotatable support member and the right rotatable support member, wherein the left support structure comprises a fixedly connected shell and a flexible screen support plate inside the fixedly connected shell, and wherein the right support structure comprises a fixedly connected shell and a flexible screen support plate inside the fixedly connected shell.

2. The hinge for an inner flexible screen mobile terminal according to claim 1, wherein the left connecting arm and the right connecting arm are connected by a transmission mechanism to achieve synchronous reverse rotation.

3. The hinge for an inner flexible screen mobile terminal according to claim 1, wherein the middle support structure, the left rotatable support member and the right rotatable support member, the left support structure, and the right support structure jointly constitute a support structure for the spreading of the flexible screen.

4. The hinge for an inner flexible screen mobile terminal according to claim 1, wherein a torque mechanism is provided between the middle support structure and the left connecting arm and between the middle support structure and the right connecting arm.

5. The hinge for an inner flexible screen mobile terminal according to claim 1, wherein the left rotatable support member and the right rotatable support member are respectively formed by integrally connecting a plurality of finger-shaped structures, and the rotation guide structure comprise a guide plate arranged in a grid plate shape and is provide with a guide groove, and the guide plate fits the clearance of the finger-shaped structures.

6. The hinge for an inner flexible screen mobile terminal according to claim 1, wherein the rotation guide structure is provided with a guide groove, and the left rotatable support member and the right rotatable support member are respectively provided with guide rods mating with the guide groove, and a flat groove is provided at the top of the guide groove, and when the hinge is rotated to a state corresponding to the spreading of the flexible screen, the movement of the left support structure and the right support structure back to the middle makes the guide rod to enter the flat groove and lock the state corresponding to the spreading of the flexible screen that the hinge is rotated to.

7. The hinge for an inner flexible screen mobile terminal according to claim 4, wherein the left connecting arm and the right connecting arm are respectively on the inside of the left support structure and the right support structure, and the sliding stroke limit structure adopts a structure that mates long holes and pins.

8. An inner flexible screen mobile terminal, wherein a flexible screen is provided inside the mobile terminal, and the mobile terminal is provided with the hinge according to claim 1, the flexible screen is laid on the inner side of the hinge, and is only fixedly connected to the middle portion of the middle support structure.

\* \* \* \* \*